(12) United States Patent
Jung et al.

(10) Patent No.: US 10,040,482 B1
(45) Date of Patent: Aug. 7, 2018

(54) DRIVER ASSISTANCE APPARATUS AND METHOD FOR OPERATING THE SAME

(71) Applicant: HYUNDAI MOTOR COMPANY, Seoul (KR)

(72) Inventors: Chan Hee Jung, Anyang-si (KR); Gil Won Seo, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/595,051

(22) Filed: May 15, 2017

(30) Foreign Application Priority Data

Mar. 13, 2017 (KR) .................. 10-2017-0031251

(51) Int. Cl.
| | |
|---|---|
| *B60Q 1/48* | (2006.01) |
| *B62D 15/02* | (2006.01) |
| *G06K 9/00* | (2006.01) |
| *G05D 1/02* | (2006.01) |
| *B60R 21/015* | (2006.01) |

(52) U.S. Cl.
CPC .... *B62D 15/0285* (2013.01); *B60R 21/01512* (2014.10); *G05D 1/0276* (2013.01); *G06K 9/00812* (2013.01); *B60T 2201/088* (2013.01); *B60T 2201/10* (2013.01)

(58) Field of Classification Search
CPC ............. B62D 15/0285; G05D 1/0276; G06K 9/00812; B60R 21/01512; B60T 2201/088; B60T 2201/10

USPC ............................ 340/932.2, 901; 701/2, 23
See application file for complete search history.

(56) References Cited

U.S. PATENT DOCUMENTS

| | | | |
|---|---|---|---|
| 7,515,034 B2* | 4/2009 | Inoue ................... | B60R 25/245 307/10.1 |
| 9,031,731 B2 | 5/2015 | Choi et al. | |
| 9,145,138 B2 | 9/2015 | Kim et al. | |
| 2014/0032031 A1 | 1/2014 | Okamura et al. | |
| 2014/0222252 A1 | 8/2014 | Matters et al. | |
| 2016/0207527 A1 | 7/2016 | Hiei et al. | |
| 2017/0259820 A1* | 9/2017 | Takahashi ........... | B60W 30/165 |

FOREIGN PATENT DOCUMENTS

| | | | | |
|---|---|---|---|---|
| JP | 2015-186997 A | 10/2015 | | |
| JP | WO 2016038931 A1 * | 3/2016 | .......... | B60W 30/165 |
| JP | 2016-095559 A | 5/2016 | | |
| WO | 2014/162753 A1 | 10/2014 | | |

* cited by examiner

*Primary Examiner* — Dhaval Patel
(74) *Attorney, Agent, or Firm* — McDermott Will & Emery LLP

(57) ABSTRACT

A driver assistance apparatus includes: a user interface generating a user input; a surroundings sensor obtaining surrounding information; and a controller verifying whether a user's intention is a remote control intention or a remote control termination intention based on at least one of the user input or the surrounding information and switching a starting mode in a case that the user's intention is the remote control intention or the remote control termination intention.

20 Claims, 7 Drawing Sheets

DRIVER ASSISTANCE APPARATUS AND METHOD FOR OPERATING THE SAME

CROSS-REFERENCE TO RELATED APPLICATION

This application is based on and claims the benefit of priority to Korean Patent Application No. 10-2017-0031251, filed on Mar. 13, 2017, in the Korean Intellectual Property Office, the disclosure of which is incorporated herein in its entirety by reference.

TECHNICAL FIELD

The present disclosure relates to a driver assistance apparatus capable of discerning a driver's intention when a vehicle remotely enters, exits, or parks in a parking space to switch a starting mode of the vehicle and a method for operating the driver assistance apparatus.

BACKGROUND

Unlike a conventional smart parking assist system (SPAS) that assists a vehicle to park itself by utilizing a motor drive power steering (MPS) to control steering along with an input of a driver for controlling an acceleration/deceleration and a transmission of the vehicle, a remote smart parking assist (RSPA) system enables the vehicle to additionally control a speed of the vehicle and the transmission of the vehicle by utilizing an electric stability control (ESC) and a shift by wire (SBW).

The RSPA system controls a steering device, a transmission device, a brake device, and an engine to perform parking when a driver push a parking start button after finding a parking space. Thus, the RSPA system remotely controls the vehicle to park in(enter)/exit a narrow parking space when the driver is not easy to get in or out of the vehicle due to a narrow space.

However, in a conventional case when the vehicle is remotely controlled to enter/exit or park in a parking space by utilizing the RSPA system with the driver outside the vehicle, the engine shuts off as the driver gets off the vehicle. Accordingly, the driver is required to remotely start the engine to transit a starting mode of the vehicle to a remote starting mode. That is, as shown in FIG. 1, when the starting mode of the vehicle is transited from a normal starting mode to the remote starting mode in conventional RSPA system, the engine is required to stop first in the normal starting mode, and then the engine starts in response to the control of a remote controller to start the remote starting mode.

Accordingly, when the starting mode is transited from the normal starting mode to the remote starting mode in conventional RSPA system, the driver has to restart the engine that is stopped as the driver gets out of the vehicle, thereby causing an inconvenience in use of the remote control function.

SUMMARY

The present disclosure has been made to solve the above-mentioned problems occurring in the prior art while advantages achieved by the prior art are maintained intact.

An aspect of the present disclosure provides a driver assistance apparatus capable of discerning a driver's intention when a vehicle remotely enters, exits, or parks in a parking space to switch a starting mode of the vehicle and a method for operating the driver assistance apparatus.

The technical problems to be solved by the present inventive concept are not limited to the aforementioned problems, and any other technical problems not mentioned herein will be clearly understood from the following description by those skilled in the art to which the present disclosure pertains.

According to an exemplary embodiment of the present disclosure, a driver assistance apparatus includes: a user interface that generates a user input; a surroundings sensor that obtains surrounding information of a vehicle; and a controller that verifies whether a user's intention is a remote control intention or a remote control termination intention based on at least one of the user input or the surrounding information and switches a starting mode in a case that the user's intention is the remote control intention or the remote control termination intention.

The driver assistance apparatus further includes a getting-on/off sensor that senses a getting-on/off the vehicle of the user.

The controller receives the user input instructing an activation of a remote control function from the user interface and determines that the user's intention is the remote control intention in a case that the getting-off the vehicle of the user is sensed by the getting-on/off sensor.

The controller receives the user input setting one of a target parking space and a target vehicle entrance space from the user interface and determines that the user's intention is the remote control intention in a case that the getting-off the vehicle of the user is sensed by the getting-on/off sensor.

The controller recognizes a stop of the vehicle in the vicinity of the target parking space or the target vehicle entrance space sensed by a navigation terminal or the surroundings sensor and determines that the user's intention is the remote control intention in a case that the getting-off the vehicle of the user is sensed by the getting-on/off sensor.

The driver assistance apparatus further includes a communicator that wireless communicates with a remote control terminal The controller receives an engine start instruction from the user interface and determines that the user's intention is the remote control intention in, a case that a remote control signal is received from the remote control terminal within a predetermined time after the getting-off the vehicle of the user is sensed by the getting-on/off sensor.

The controller determines that the user's intention is not the remote control intention in a case that the remote control signal is not received within the predetermined time.

The controller determines that the user's intention is the remote control termination intention in a case that an engine of the vehicle starts and the vehicle completely exits in response to a remote control signal provided from the remote control terminal.

The controller determines that the user's intention is the remote control termination intention in a case that the remote control terminal is located inside the vehicle after an engine of the vehicle starts and the vehicle completely exits in response to a remote control signal provided from the remote control terminal.

The controller determines that the user's intention is the remote control termination intention in a case that the user interface is operated after an exit of the vehicle is remotely completed.

The starting mode includes a normal starting mode and a remote starting mode.

According to another exemplary embodiment of the present disclosure, a method of operating a driver assistance apparatus includes: verifying a user's intention based on at least one of a user input or surrounding information; and switching a starting mode in a case that the user's intention is a remote control intention or a remote control termination intention.

The verifying the user's intention based on at least one of the user input or the surrounding information includes verifying whether the user's intention is the remote control intention or the remote control termination intention.

The verifying the user's intention based on at least one of the user input or the surrounding information includes determining that the user's intention is the remote control intention in a case that a remote control function is activated in response to the user input and a getting-off a vehicle of the user is sensed by a getting-on/off sensor.

The verifying the user's intention based, on at least one of the user input or the surrounding information includes determining that the user's intention is the remote control intention in a case that one of a target parking space and a target vehicle entrance space is set by the user input and a getting-off a vehicle of the user is sensed by a getting-on/off sensor.

The verifying the user's intention based on at least one of the user input or the surrounding information includes determining that the user's intention is the remote control intention in a case that a stop of a vehicle in the vicinity of a target parking space or a target vehicle entrance space is sensed by a navigation terminal or a surroundings sensor and a getting-off a vehicle of the user is sensed by a getting-on/off sensor.

The verifying the user's intention based on at least one of the user input or the surrounding information includes determining that the user's intention is the remote control intention in a case that an engine starts in response to the user input, a getting-off a vehicle of the user is sensed by a getting-on/off sensor, and a remote control signal is received from a remote control terminal within a predetermined time.

The verifying the user's intention based on at least one of the user input or the surrounding information includes determining that the user's intention is not the remote control intention in a case that the remote control signal is not received within the predetermined time.

The verifying the user's intention based on at least one of the user input or the surrounding information includes determining that the user's intention is the remote control termination intention in a case that an engine of a vehicle starts and the vehicle completely exits in response to a remote control signal provided from a remote control terminal.

The verifying the user's intention based on at least one of the user input or the surrounding information includes determining that the user's intention is the remote control termination intention in a case that a remote control terminal is located inside a vehicle after an engine of a vehicle starts and the vehicle completely exits in response to a remote control signal provided from the remote control terminal.

The verifying the user's intention based on at least one of the user input or the surrounding information includes determining that the user's intention is the remote control termination intention in a case that a user interface is operated after an exit of the vehicle is remotely completed.

The verifying the user's intention based on at least one of the user input or the surrounding information includes determining that the user's intention is the remote control termination intention in a case that a getting-on a vehicle of the user is sensed by a getting-on/off sensor after an exit of the vehicle is remotely completed.

BRIEF DESCRIPTION OF THE DRAWINGS

The above and other objects, features and, advantages of the present disclosure will be more apparent from the following detailed description taken in conjunction with the accompanying drawings.

DETAILED DESCRIPTION

Figure 1:
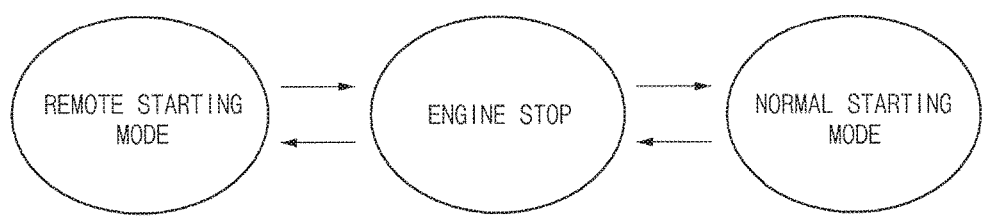
FIG. 1 is a view illustrating a transition of a starting mode of a vehicle according to a conventional art.

Hereinafter, exemplary embodiments of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
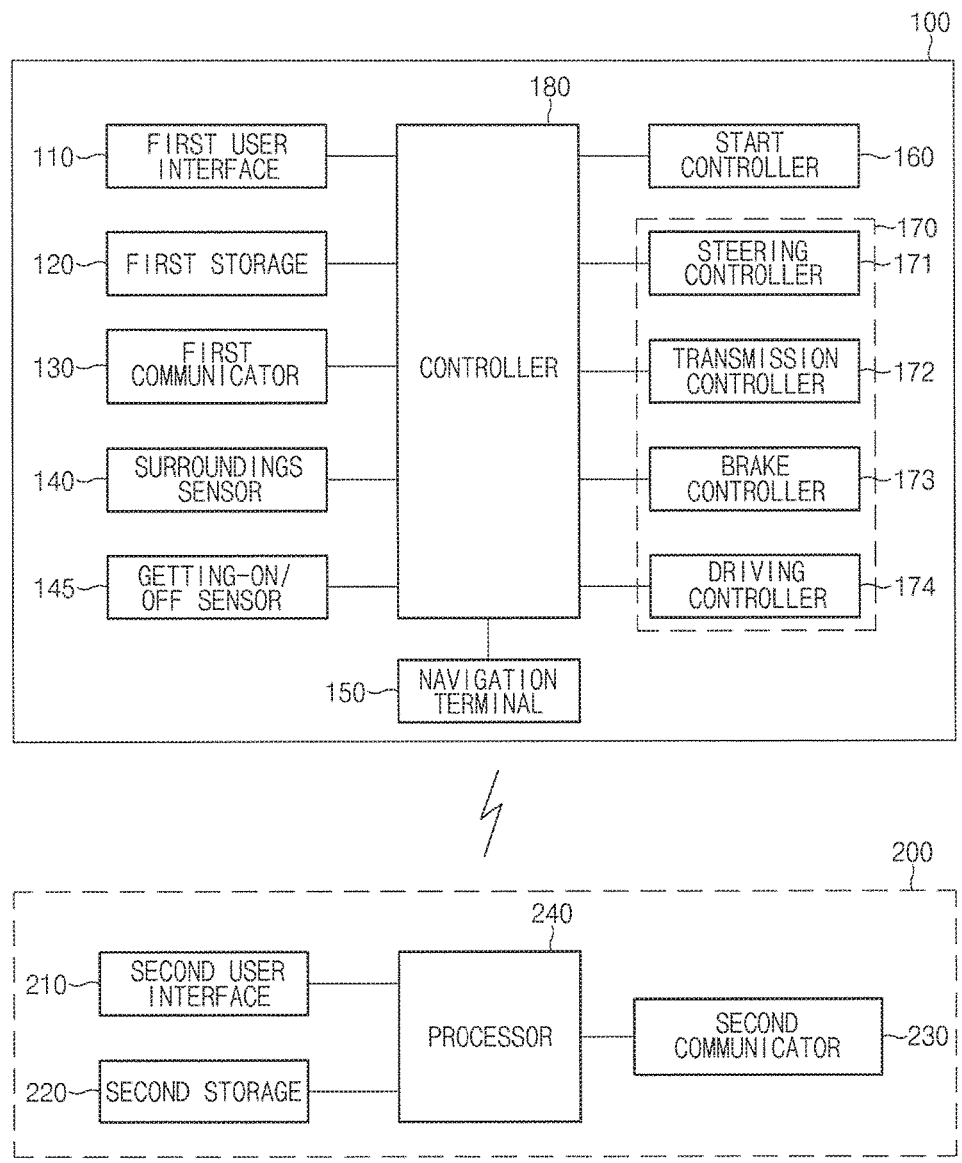
FIG. 2 is a block diagram illustrating a configuration of a remote driver assistance system according to an exemplary embodiment of the present disclosure.
Figure 3:
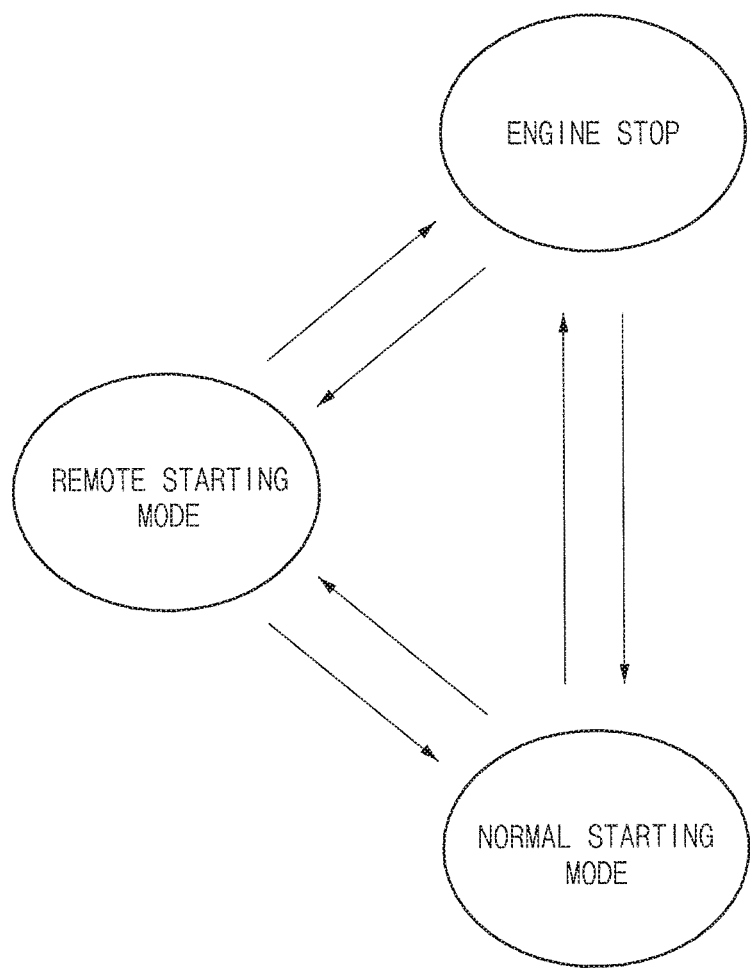
FIG. 3 is a view illustrating a transition of a starting mode of a vehicle according to an exemplary embodiment of the present disclosure.

FIG. 2 is a block diagram illustrating a configuration of a remote driver assistance system according to an exemplary embodiment of the present disclosure, and FIG. 3 is a view illustrating a transition of a starting mode of a vehicle according to an exemplary embodiment of the present disclosure.

The remote driver assistance system may include a driver assistance apparatus 100 installed in a vehicle and a remote control terminal 200 for instructing a remote control of the vehicle in response to a user (e.g., a driver) operation.

The driver assistance apparatus 100 may switch a starting mode of the vehicle by taking into account a driver's intention. The starting mode may include a normal starting mode and a remote starting mode as shown in Table 1.

TABLE 1

|  | IBU (Integrated Body Controller) state | Engine state |
| --- | --- | --- |
| Normal starting mode | IBU is maintained in an on-state IBU is able to control system Remote Keyless Entry (RKE) telegram processing is not possible | Maintaining engine at running state |
| Remote starting mode | IBU is maintained in an off-state IBU is not able to control system RKE telegram processing is possible | Maintaining engine at running state |

The driver assistance apparatus 100 may include a first user interface 110, a first storage 120, a first communicator 130, a surroundings sensor 140, a getting-on/off sensor 145, a navigator 150, a start controller 160, a vehicle controller 170, and a controller 180. Each of the first user interface 110, the first communicator 130, the surroundings sensor 140, the getting-on/off sensor 145, the navigator 150, the start controller 160, and the vehicle controller 170. The controller 180 may be implemented by a combination of hardware and software installed on the hardware and programmed to execute a predetermined operation. The hardware may include at least one processor and a memory. Here, the processor may include one or more of, for example, application specific integrated circuits (ASICs), digital signal processors (DSPs), microcontrollers, and microprocessors. The memory may include one or more of, for example, a volatile memory (e.g., RAM, etc.) and a non-volatile memory (e.g., ROM, a flash memory, etc.).

The first user interface 110 may generate data (e.g., information, control signals, control instructions, etc.) in response to a user operation (input). The first user interface 110 may generate and output instructions to activate or deactivate a remote control function (e.g., a remote vehicle parking operation, a remote vehicle entrance/exit operation, etc.) in response to the user input. For instance, in a case where the driver operates an automatic parking button of the first user interface 110, the driver assistance apparatus 100 may activate or deactivate the remote control function.

The first user interface 110 may be implemented by one or more of various input devices, such as a button, a switch, a voice recognizer, a motion recognizer, a touch pad, a touch screen, etc.

The first storage 120 may store a program for an operation of the controller 180 and may temporarily store data input thereto or output therefrom. The first storage 120 may be implemented by at least one storage of a flash memory, a hard disk, a secure digital (SD) card, a random access memory (RAM), a read only memory (ROM), or a web storage.

The first communicator 130 may be a wireless transceiver that communicates by wireless communication with the remote control terminal 200. As a wireless communication technology, a mobile communication technology, such as a code division multiple access (CDMA), a global system for mobile communication (GSM), a long term evolution (LTE), etc., a wireless internet technology, such as a wireless LAN (WLAN), a WiFi, a wireless broadband (Wibro), a world interoperability for microwave access (Wimax), a high speed downlink packet access (HSDPA), etc., or a short-range communication technology, such as a Bluetooth, a radio frequency identification (RFID), an infrared data association (IrDA), an ultra wideband (UWB), a ZigBee, etc.

The first communicator 130 may receive a remote control signal (a remote signal) from the remote control terminal 200 and apply the remote control signal to the controller 180. The first communicator 130 may transmit a response signal with respect to the remote control signal according to a control of the controller 180. The first communicator 130 may include a signal processor that signal-processes (amplification and/or noise reduction) data to be transmitted/received and a memory.

The surroundings sensor 140 may obtain surrounding information (e.g., a terrain, an obstacle, a nearby vehicle, etc.) of the vehicle by using various sensors mounted in the vehicle. The surroundings sensor 140 may search for a parking space or a vehicle entrance space based on the surrounding information (e.g., peripheral environment and/or peripheral situation) obtained by the sensors and may transmit the searched result to the controller 180.

The surroundings sensor 140 may include an image sensor, a distance sensor, a position sensor, and the like. The image sensor may be implemented by one or more of various sensors, such as a charge coupled device (CCD) image sensor, a metal oxide semi-conductor (MOS) image sensor, a charge priming device (CPD) image sensor, a charge injection device (CID) image sensor, an omnidirectional image sensor, etc. The distance sensor may be an ultrasonic sensor, a radio detecting and ranging (RADAR), or a light detection and ranging (LiDAR). As the position sensor, a global positioning system (GPS) receiver may be used.

The getting-on/off sensor 145 may sense a user's (driver's) getting-on/off the vehicle. The getting-on/off sensor 145 may be implemented by one or more of sensors, such as a sensor sensing opening and closing of a door of the vehicle, a pressure sensor mounted on each seat, an image sensor, a heat sensor, etc. In addition, the getting-on/off sensor 145 may sense whether the driver is on board the vehicle by measuring a distance between the remote control terminal 200 and the getting-on/off sensor 145 through a wireless communication with the remote control terminal 200.

The navigation terminal 150 may display a current position of the vehicle on a map using map data and the GPS receiver and output the map to a display (not shown). The navigation terminal 150 may search for and guide a route from the current position of the vehicle to a target position designated by the user. In this case, the navigation terminal 150 may output the guide for the route in visual and/or auditory signals. For instance, the navigation terminal 150 may output route guidance information through a display and a speaker.

The start controller 160 may receive an engine start instruction from the first user interface 110 or the remote control terminal 200 and output a signal required to start the engine to an engine controller (ECU) through a user authentication process. The start controller 160 may perform a mutual authentication with the remote control terminal 200 via the first communicator 130 during the remote control of the vehicle. The start controller 160 may be implemented by an immobilizer electronic control unit (ECU).

In a case that one parking space of parking spaces (or vehicle entrance spaces) searched by the surroundings sensor 140 is selected by the user, the vehicle controller 170 may set the selected parking space to a target parking space. The vehicle controller 170 may generate a driving trajectory between the current position of the vehicle and the target parking space to park the vehicle in the target parking space. In this case, the vehicle controller 170 may generate the driving trajectory using a parking trajectory generation technology that is publicly known. The vehicle controller 170 may detect information about condition and movement of the vehicle by using sensors of the vehicle, e.g., a vehicle speed sensor, a steering angle sensor, etc., and control the movement of the vehicle to follow a predetermined driving trajectory. As described above, the vehicle controller 170 may automatically park the vehicle in the target parking space set by the user.

The vehicle controller 170 may set a target vehicle exit position in response to a user instruction and control the movement of the vehicle based on data measured by the sensors of the vehicle, and thus, the vehicle may fully automatically move to the set target vehicle exit position. The vehicle controller 170 may wireless communicate with the remote control terminal 200 via the first communicator 130 to recognize a position of the remote control terminal 200 and may set the recognized position of the remote control terminal 200 to the target vehicle exit position. In this case, the vehicle controller 170 may recognize the position of the remote control terminal 200 by using a position recognition technology that is publicly known. In addition, the vehicle controller 170 may generate the driving trajectory by using a vehicle exit trajectory generation technology that is publicly known and control the movement of the vehicle to follow the generated driving trajectory to the target vehicle exit position.

The vehicle controller 170 may include a steering controller 171, a transmission controller 172, a brake controller 173, and a driving controller 174. The processor of the vehicle controller 170 may control the steering controller 171, the transmission controller 172, the brake controller 173, and the driving controller 174 based on the condition and movement of the vehicle to allow the vehicle to park at, enter, or exit a parking space. Each of the steering controller 171, the transmission controller 172, the brake controller 173, and the driving controller 174 may include a processor and a memory.

The steering controller 171 may control a steering angle of the vehicle. The steering controller 171 may be implemented by a motor drive power steering (MDPS).

The transmission controller 172 may detect a rotation speed of an engine and a driving speed of the vehicle by using the sensors mounted in the vehicle and control a transmission of the vehicle based on the detected rotation speed of the engine and the detected driving speed to perform a gear shift. The transmission controller 172 may be implemented by an electronic shifter or a shift-by-wire (SBW).

The brake controller 173 may control a braking device to decrease the speed of the vehicle or to stop the vehicle. The brake controller 173 may be implemented by an electronic stability control (ESC) or a brake-by-wire (BBW).

The driving controller 174 may control a drive of the engine to control the speed of the vehicle. The driving controller 174 may be implemented by an engine control unit (ECU). The driving controller 174 may control a driving torque of the engine based on accelerator pedal position information output from an accelerator pedal position sensor. The driving controller 174 may control an engine output to follow a target driving torque requested by the processor of the vehicle controller 170 when an autonomous parking is performed.

The controller 180 may control a start or stop of the engine, a lock or unlock of a door, a wiper operation, a washer operation, and the like. The controller 180 may be implemented by an integrated body control unit (IBU).

In a case that an engine start instruction is received from the first user interface 110 in an engine stop state, the controller 180 may enter the normal starting mode from the engine stop state (mode). In a case that an engine stop instruction is received from the first user interface 110 in the normal starting mode, the controller 180 may switch the normal starting mode to the engine stop mode (state).

In a case that the engine start instruction is received from the remote control terminal 200 during the engine stop state, the controller 180 may enter the remote starting mode from the engine stop state. In a case that the engine stop instruction is received from the remote control terminal 200 during the remote starting mode, the controller 180 may switch the remote starting mode to the engine stop state.

The controller 180 may discern the driver's intention (user's intention) to perform the transition of the starting mode. Here, the driver's intention may be one of a remote control intention and a remote control termination intention. The remote control intention may include a remote parking intention and a remote vehicle entrance intention, and the remote control termination intention may include a remote vehicle exit intention.

The controller 180 may switch the remote starting mode to the normal starting mode or the normal starting mode to the remote starting mode based on the discerned driver's intention. In other words, the controller 180 may switch the remote starting mode to the normal starting mode or the normal starting mode to the remote starting mode based on the driver's intention without going through the engine stop state when the remote starting mode is transited to the normal starting mode or vice versa.

In a case where the driver gets out of the vehicle, the controller 180 may verify the driver's intention. For instance, the controller 180 may sense the getting-on/off of the driver through the sensor for sensing the opening and closing of the door and/or the sensor mounted on the seat for sensing whether the driver is on board the vehicle.

In a case where the getting-off of the driver is sensed by the getting-on/off sensor 145, the controller 180 may verify whether the remote control function is activated. For instance, in the case where the getting-off of the driver is sensed via the pressure sensor mounted on the seat, the controller 180 may verify whether an on-off switch of a remote parking function of the first user interface 110 is in an on-state.

The controller 180 may verify whether a manual operation of the driver is completed among remote control scenarios. For instance, in a case that the driver gets off the vehicle after completing the search of the parking space and the set of the target parking space among remote parking scenarios, the controller 180 may recognize that the driver gets off the vehicle after completing the manual operation. Accordingly, the controller 180 may determine that the driver has the remote parking intention (the remote control intention).

The controller 180 may determine that the driver has the remote parking intention in the case that the getting-off of the driver is sensed after the parking space is recognized via the navigation terminal 150 or the surroundings sensor 140 or the getting-off of the driver is sensed after the vehicle stops in the vicinity of a learned parking space. When it is determined that the driver has the remote parking intention, the controller 180 may switch the normal starting mode to the remote starting mode to receive the control signal from the remote control terminal 200.

In a case that the driver gets off the vehicle after starting the engine, the controller 180 may enter the remote starting mode and wait for a predetermined time. For instance, when the engine starts by the manual operation of the driver, the controller 180 may enter the normal starting mode, and then, in the case that the getting-off of the driver is sensed, the controller 180 may enter the remote starting mode and maintain the remote starting mode during the predetermined time. In a case that a vehicle entrance instruction signal (a remote control signal) is received from the remote control terminal 200 during the predetermined time, the controller 180 may determine that the driver has the remote vehicle entrance intention.

When the vehicle entrance instruction signal (e.g., a vehicle entrance instruction) is not received from the remote control terminal 200 during the predetermined time, the controller 180 may switch the remote starting mode to the normal starting mode.

The controller 180 may perform (complete) the remote vehicle exit in response to the remote control signal (e.g., a vehicle exit instruction signal) from the remote control terminal 200, and the controller 180 may determine that the driver has the remote vehicle exit termination intention (remote control termination intention) in the case that the remote control terminal 200 is located inside the vehicle, a vehicle system is operated by the driver via a switch in the vehicle or the first user interface 110, or the vehicle has moved to the target vehicle exit position by the remote control.

The remote control terminal 200 may be implemented by a user portable terminal, such as a smart key, a smart phone, a mobile terminal, a notebook, etc., or a server for parking management in the parking lot. The remote control terminal 200 may include a second user interface 210, a second storage 220, a second communicator 230, and a processor 240. The processor 240 may be implemented by a combination of hardware and software installed on the hardware and programmed to execute a predetermined operation. The hardware may include at least one processor and a memory.

The second user interface 210 may generate a control signal in response to a user's operation and may be implemented by one or a combination of two or more of input devices, such as a button, a key, a touch pad, a touch screen, a key pad, etc. In the present exemplary embodiment, the control signal may be a signal (an instruction) instructing to lock or unlock the door, to open a trunk, to start the engine, to stop the engine, the vehicle to park, the vehicle to enter, the vehicle to exit, to interrupt an operation, and the like.

The second storage 220 may store a program and input/output data for the operation of the remote control terminal 200. The second storage 220 may store authentication information (e.g., a pin code and/or a password) required to authenticate a user. The second storage 220 may be implemented by one or more of storage media, such as a flash memory, a secure digital (SD) card, a random access memory (RAM), and a read only memory (ROM).

The second communicator 230 may be a wireless transceiver that communicates by wireless communication with the first communicator 130 of the driver assistance apparatus 100. That is, the second communicator 230 may transmit the control signal to the first communicator 130 and receive a signal from the first communicator 130 by using the same wireless communication technology as the first communicator 130.

The processor 240 may transmit the control signal output from the second user interface 210 through the second communicator 230. In this case, the processor 240 may perform a signal processing to encode or decode the data to be transmitted/received based on the wireless communication technology used by the second communicator 230.

The various embodiments disclosed herein, including embodiments of the driver assistance apparatus 100 and/or elements thereof, can be implemented using one or more processors coupled to a memory (or other non-transitory machine readable recording medium) storing computer-executable instructions for causing the processor (s) to perform the functions described above including the functions described in relation to the first communicator 130, the start controller 160. The remote control terminal 200 and/or elements thereof also can be implemented using one or more processors coupled to a memory (or other non-transitory machine readable recording medium) storing computer-executable instructions for causing the processor (s) to perform the functions described above including the functions described in relation to the processor 240 and the second communicator 230.

Figure 4:
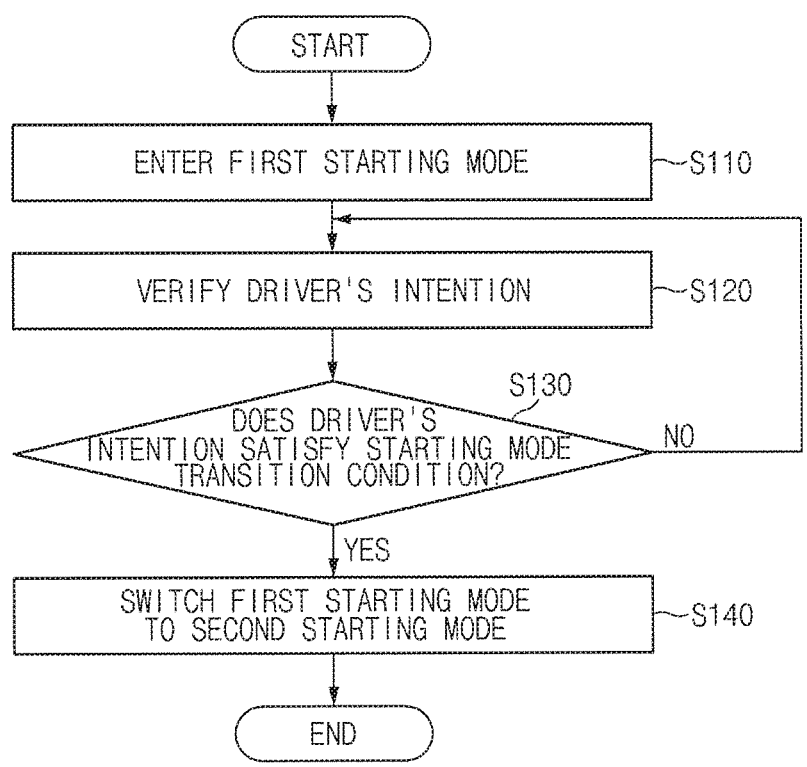
FIG. 4 is a flowchart illustrating a method of operating a driver assistance apparatus according to an exemplary embodiment of the present disclosure.

FIG. 4 is a flowchart illustrating a method of operating a driver assistance apparatus according to an exemplary embodiment of the present disclosure.

As shown in FIG. 4, the controller 180 of the driver assistance apparatus 100 may enter a first starting mode (S110). The controller 180 may enter the remote starting mode when the remote control function is activated by the first user interface 110 in the engine stop state. The controller 180 may enter the normal starting mode when the driver manually starts the vehicle in the engine stop state.

The controller 180 may verify the driver's intention in the first starting mode (S120). The controller 180 may verify whether the driver has the remote control intention (e.g., the remote vehicle parking intention or the remote vehicle entrance intention) or has the remote control termination intention (e.g., the remote vehicle exit termination intention).

The controller 180 may verify whether the driver's intention satisfies a starting mode transition condition (S130). The driver's intention may be verified to satisfy the starting mode transition condition in any of the following cases: a case that the driver gets off the vehicle after activating the remote control function, a case that the driver gets off the vehicle after setting the parking space or the vehicle entrance space, a case that the driver gets off the vehicle after stopping the vehicle in the vicinity of the parking space or the vehicle entrance space recognized by the navigation terminal 150 or the surroundings sensor 140, a case that the driver gets off the vehicle after manually starting the engine, a case that the remote control terminal 200 is located inside the vehicle when the vehicle is exiting or after the vehicle has completely moved to the target vehicle exit position, a case that the vehicle system is operated via the first user interface 110 inside the vehicle when the vehicle is exiting or after the vehicle has completely moved to the target vehicle exit position, and a case that the getting-on of the driver is sensed when the vehicle is exiting or after the vehicle has completely moved to the target vehicle exit position.

In the case that the driver's intention satisfies the starting mode transition condition, the controller 180 may switch the starting mode to a second starting mode from the first starting mode (S140). The controller 180 may switch the normal starting mode to the remote starting mode or the remote starting mode to the normal starting mode.

Figure 5:
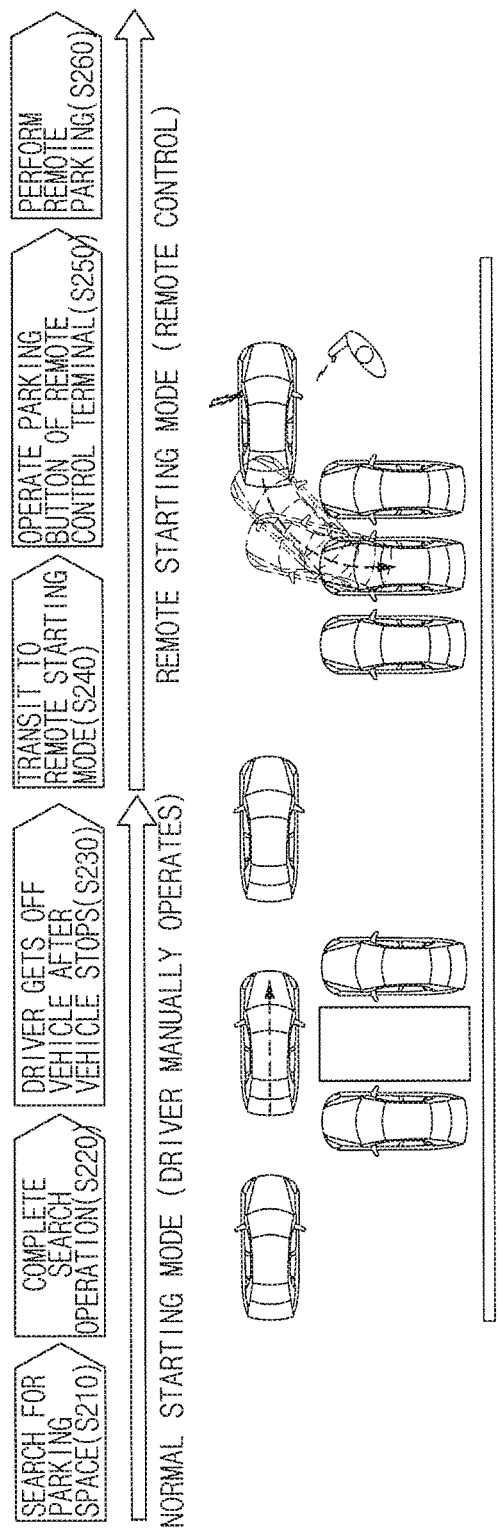
FIG. 5 is a view illustrating a transition of a starting mode of a vehicle when parking the vehicle in a parking space remotely according to another exemplary embodiment of the present disclosure.

FIG. 5 is a view illustrating a transition of a starting mode of a vehicle when parking the vehicle in a parking space remotely according to another exemplary embodiment of the present disclosure.

The controller 180 of the driver assistance apparatus 100 may search for the parking space using the surroundings sensor 140 in the normal starting mode (S210). Then, in the case that one parking space of the parking spaces searched by the surroundings sensor 140 is selected by the manual operation of the driver, the controller 180 may set the selected parking space to the target parking space and complete the search operation (S220).

In the case that the driver stops the vehicle close to the target parking space and gets off the vehicle after the search operation of the parking space is completed, the controller 180 may sense the getting-off of the driver (S230). In other words, when the driver stops the vehicle close to the target parking space and gets off the vehicle after setting the target parking space based on an automatic parking scenario, the controller 180 may sense the getting-off of the driver via the getting-on/off sensor 145 and verify the set target parking space.

When the driver stops the vehicle close to the target parking space and gets off the vehicle, the controller 180 may determine that the driver has the remote parking intention and switch. (transition) the normal starting mode to the remote starting mode (S240). The controller 180 may enter the remote starting mode and wait for the reception of the remote control signal transmitted from the remote control terminal 200.

When, the driver operates the parking button of the second user interface 210 of the remote control terminal 200, the processor 240 of the remote control terminal 200 may transmit the parking instruction through the second communicator 230 (S250). In the case that the parking instruction is received via the first communicator 130, the controller 180 may park the vehicle in the target parking space in response to the received parking instruction (S260).

Figure 6:
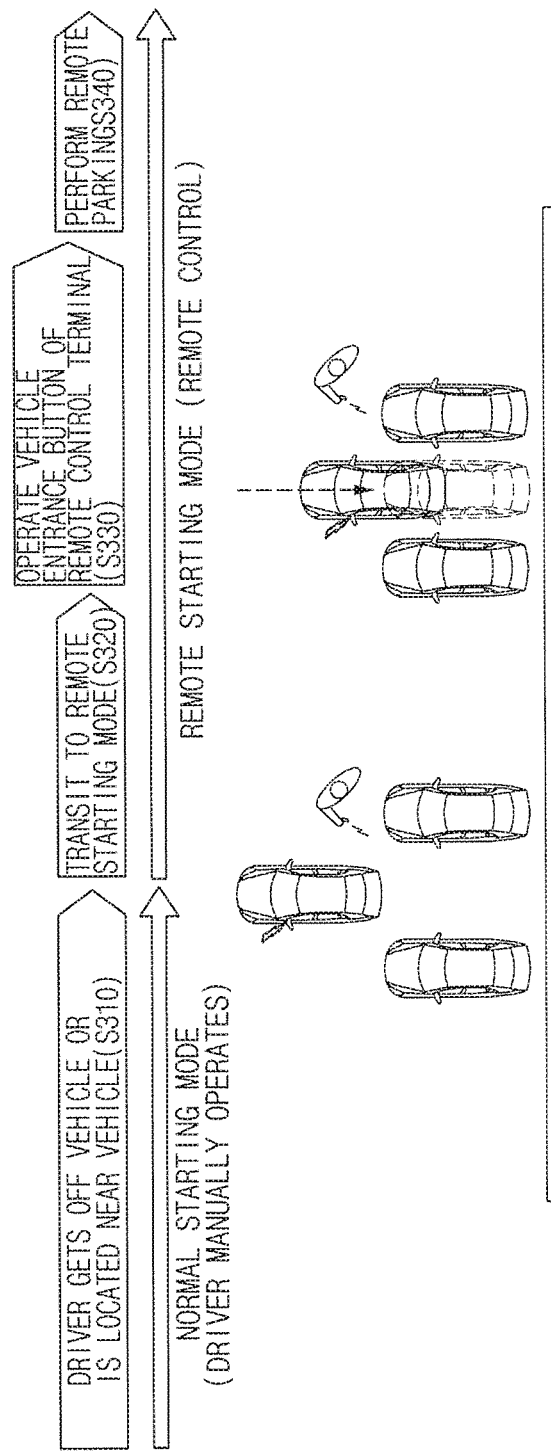
FIG. 6 is a view illustrating a transition of a starting mode of a vehicle when moving the vehicle into a parking space remotely according to another exemplary embodiment of the present disclosure.

FIG. 6 is a view illustrating a transition of a starting mode of a vehicle when moving the vehicle into a parking space remotely according to another exemplary embodiment of the present disclosure.

The controller 180 of the driver assistance apparatus 100 may verify whether the driver gets off the vehicle in the normal starting mode or the driver is located near the vehicle after getting off the vehicle (S310). For instance, in the case that the driver manually starts the engine and gets off the vehicle after stopping the vehicle in a certain position, the controller 180 may sense the getting-off of the driver via the getting-on/off sensor 145. In this case, the controller 180 may further verify whether the driver is located near the vehicle after getting off the vehicle. The controller 180 may estimate a distance (e.g., a distance between the vehicle and the driver) between the vehicle and the remote control terminal 200 by communicating with the remote control terminal 200 carried by the driver.

When the driver gets off the vehicle or the driver is located near the vehicle after getting off the vehicle in the normal starting mode, the controller 180 may determine that the driver has the remote vehicle entrance intention. When the driver has the remote vehicle entrance intention, the controller 180 may switch the normal starting mode to the remote starting mode (S320).

Then, when the driver operates a vehicle entrance button of the remote control terminal 200, the processor 240 of the remote control terminal 200 may transmit the vehicle entrance instruction via the second communicator 230 (S330). The controller 180 of the driver assistance apparatus 100 may receive the vehicle entrance instruction transmitted from the remote control terminal 200 via the first communicator 130 and allow the vehicle to enter the target vehicle entrance space in response to the received vehicle entrance instruction (S340).

Figure 7:
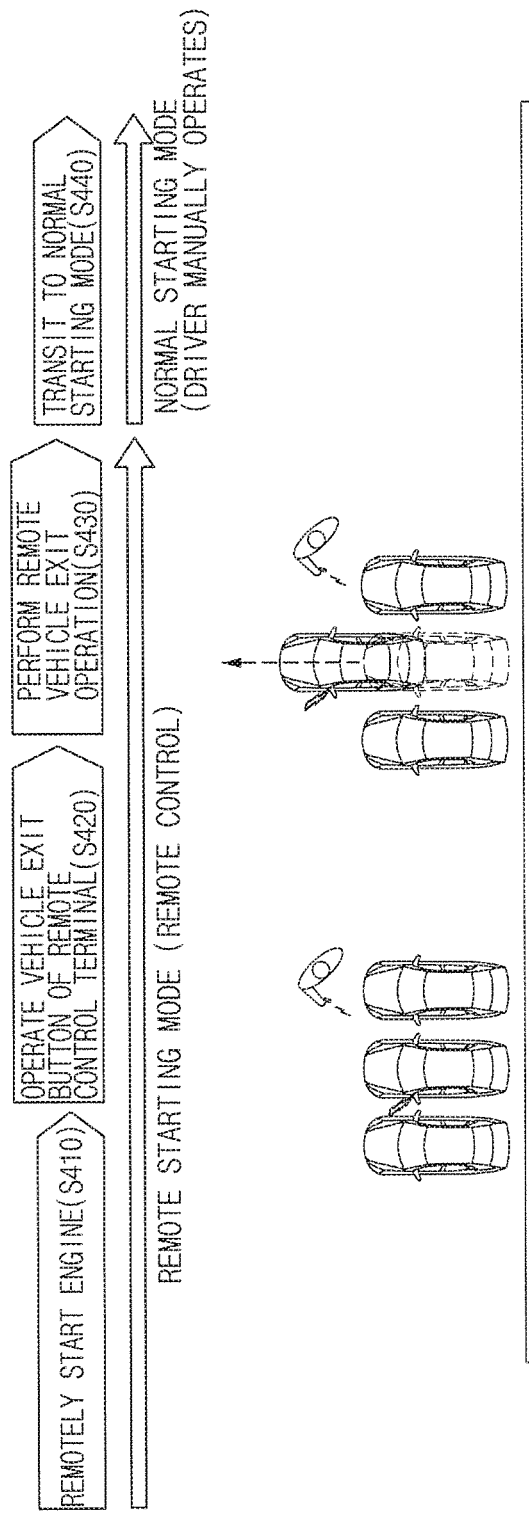
FIG. 7 is a view illustrating a transition of a starting mode of a vehicle when moving the vehicle out of a parking space remotely according to another exemplary embodiment of the present disclosure.

FIG. 7 is a view illustrating a transition of a starting mode of a vehicle when moving the vehicle out of a parking space remotely according to another exemplary embodiment of the present disclosure.

The driver assistance apparatus 100 may start the engine in response to the engine start instruction transmitted from the remote control terminal 200 (S410). For instance, when the driver operates an engine start button of the second user interface 210 of the remote control terminal 200, the processor 240 of the remote control terminal 200 may transmit the engine start instruction corresponding to the engine start button via the second communicator 230. The controller 180 of the driver assistance apparatus 100 of the parked vehicle may receive the engine start instruction transmitted from the remote control terminal 200 via the first communicator 130. The controller 180 may start the engine in response to the received engine start instruction and wait. In this case, the controller 180 of the driver assistance apparatus 100 may enter the remote starting mode from the engine stop mode.

The driver assistance apparatus 100 may perform the vehicle exit operation in response to the control instruction transmitted from the remote control terminal 200 (S420). In a case that a vehicle exit button of the second user interface 210 is operated by the driver, the processor 240 of the remote control terminal 200 may transmit the vehicle exit instruction. The controller 180 of the driver assistance apparatus 100 may move the parked vehicle out of the parking space in response to the vehicle exit instruction from the remote control terminal 200.

The controller 180 may switch the remote starting mode to the normal starting mode when the vehicle has completely moved out of the parking space (S440). For instance, in a case that the getting-on of the driver is sensed via the getting-on/off sensor 145 after the vehicle has completely moved out of the parking space, the controller 180 may determine that the driver has the remote vehicle exit termination intention, and thus, the controller 180 may switch the remote starting mode to the normal starting mode.

According to the above, the driver assistance apparatus discerns the driver's intention and switches the starting mode when the vehicle remotely enters, exits from, or parks in the parking space. Accordingly, a usability of the driver assistance apparatus may be improved, and the movement and operation of the vehicle, which are not intended by the driver or not necessary, may not be performed.

While the present disclosure has been described with reference to exemplary embodiments, it will be apparent to those skilled in the art that various changes and modifications may be made without departing from the spirit and scope of the present disclosure.

Therefore, exemplary embodiments of the present disclosure are not limiting, but illustrative, and the spirit and scope of the present disclosure is not limited thereto. The spirit and scope of the present disclosure should be interpreted by the following claims, and it should be interpreted that all technical ideas which are equivalent to the present disclosure are included in the spirit and scope of the present disclosure.

What is claimed is:

1. A driver assistance apparatus comprising:
a user interface configured to generate a user input;
a controller configured to verify whether a user's intention is a remote control intention or a remote control termination intention based on the user input and a user's action and to switch a starting mode when the user's intention is the remote control intention or the remote control termination intention,
wherein the user's action includes getting-on/off a vehicle of the user.

2. The driver assistance apparatus of claim 1, further comprising a getting-on/off sensor configured to sense the getting-on/off the vehicle of the user.

3. The driver assistance apparatus of claim 2, wherein the controller is configured to:
receive the user input for instructing an activation of a remote control function from the user interface; and
determine that the user's intention is the remote control intention when the getting-off the vehicle of the user is sensed by the getting-on/off sensor.

4. The driver assistance apparatus of claim 3, wherein the controller is configured to:
receive the user input for setting one of a target parking space and a target vehicle entrance space from the user interface; and
determine that the user's intention is the remote control intention when the getting-off the vehicle of the user is sensed by the getting-on/off sensor.

5. The driver assistance apparatus of claim 2, further comprising a surroundings sensor configured to obtain surrounding information of the vehicle,
wherein the controller is configured to:
recognize a stop of the vehicle in the vicinity of the target parking space or the target vehicle entrance space sensed by a navigation terminal or the surroundings sensor; and
determine that the user's intention is the remote control intention when the getting-off the vehicle of the user is sensed by the getting-on/off sensor.

6. The driver assistance apparatus of claim 2, further comprising a communicator configured to wireless communicate with a remote control terminal.

7. The driver assistance apparatus of claim 6, wherein the controller is configured to:
receive an engine start instruction from the user interface; and
determine that the user's intention is the remote control intention when a remote control signal is received from the remote control terminal within a predetermined time after the getting-off the vehicle of the user is sensed by the getting-on/off sensor.

8. The driver assistance apparatus of claim 7, wherein the controller is configured to determine that the user's intention is not the remote control intention in a case that the remote control signal is not received within the predetermined time.

9. The driver assistance apparatus of claim 6, wherein the controller is configured to determine that the user's intention is the remote control termination intention in a case that an engine of the vehicle starts and the vehicle completely exits in response to a remote control signal provided from the remote control terminal.

10. The driver assistance apparatus of claim 6, wherein the controller is configured to determine that the user's intention is the remote control termination intention in a case that the remote control terminal is located inside the vehicle after an engine of the vehicle starts and the vehicle completely exits in response to a remote control signal provided from the remote control terminal.

11. The driver assistance apparatus of claim 6, wherein the controller is configured to determine that the user's intention is the remote control termination intention in a case that the user interface is operated after an exit of the vehicle is remotely completed.

12. The driver assistance apparatus of claim 1, wherein the starting mode comprises a normal starting mode and a remote starting mode.

13. A method of operating a driver assistance apparatus, the method comprising steps of:
verifying a user's intention based on at least one of a user input and a user's action; and
switching a starting mode in a case that the user's intention is a remote control intention or a remote control termination intention
wherein the user's action includes getting-on/off a vehicle of the user.

14. The method of claim 13, wherein the step of verifying comprises verifying whether the user's intention is the remote control intention or the remote control termination intention.

15. The method of claim 14, wherein the step of verifying comprises determining that the user's intention is the remote control intention in a case that a remote control function is activated in response to the user input and a getting-off a vehicle of the user is sensed by a getting-on/off sensor.

16. The method of claim 14, wherein the step of verifying comprises determining that the user's intention is the remote control intention in a case that one of a target parking space and a target vehicle entrance space is set by the user input and a getting-off a vehicle of the user is sensed by a getting-on/off sensor.

17. The method of claim 14, wherein the step of verifying comprises determining that the user's intention is the remote control intention in a case that a stop of a vehicle in the vicinity of a target parking space or a target vehicle entrance space is sensed by a navigation terminal or a surroundings sensor and a getting-off a vehicle of the user is sensed by a getting-on/off sensor.

18. The method of claim 14, wherein the step of verifying comprises determining that the user's intention is the remote control intention in a case that an engine starts in response to the user input, a getting-off a vehicle of the user is sensed by a getting-on/off sensor, and a remote control signal is received from a remote control terminal within a predetermined time.

19. The method of claim 18, wherein the step of verifying comprises determining that the user's intention is not the remote control intention in a case that the remote control signal is not received within the predetermined time.

20. The method of claim 14, wherein the step of verifying comprises determining that the user's intention is the remote control termination intention in a case that a getting-on a vehicle of the user is sensed by a getting-on/off sensor after an exit of the vehicle is remotely completed.

* * * * *